United States Patent
Van Der Heijden

(10) Patent No.: US 7,523,331 B2
(45) Date of Patent: Apr. 21, 2009

(54) POWER SAVING OPERATION OF AN APPARATUS WITH A CACHE MEMORY

(75) Inventor: Gerardus Wilhelmus Theodorus Van Der Heijden, Eindhoven (NL)

(73) Assignee: NXP B.V., Eindhoven (NL)

( * ) Notice: Subject to any disclaimer, the term of this patent is extended or adjusted under 35 U.S.C. 154(b) by 38 days.

(21) Appl. No.: 10/571,636

(22) PCT Filed: Aug. 30, 2004

(86) PCT No.: PCT/IB2004/051602

§ 371 (c)(1),
(2), (4) Date: Mar. 13, 2006

(87) PCT Pub. No.: WO2005/026928

PCT Pub. Date: Mar. 24, 2005

(65) Prior Publication Data

US 2007/0055901 A1    Mar. 8, 2007

(30) Foreign Application Priority Data

Sep. 16, 2003   (EP)   .................................. 03103397

(51) Int. Cl.
G06F 1/00 (2006.01)
G06F 1/26 (2006.01)
G06F 1/32 (2006.01)
(52) U.S. Cl. ...................... 713/323; 713/300; 713/320; 713/324
(58) Field of Classification Search .................. 713/300, 713/320, 324, 323
See application file for complete search history.

(56) References Cited

U.S. PATENT DOCUMENTS

| | | | | |
|---|---|---|---|---|
| 5,253,352 A * | 10/1993 | Olson | .......................... | 710/107 |
| 5,893,142 A * | 4/1999 | Moyer et al. | ................. | 711/125 |
| 5,928,365 A * | 7/1999 | Yoshida | ...................... | 713/324 |
| 6,044,478 A * | 3/2000 | Green | .......................... | 714/42 |
| 6,105,141 A * | 8/2000 | Hanlon et al. | ................ | 713/323 |
| 6,260,151 B1 * | 7/2001 | Omizo et al. | ................ | 713/324 |
| 6,347,370 B1 * | 2/2002 | Grimsrud | ........................ | 713/1 |
| 7,058,829 B2 * | 6/2006 | Hamilton | ..................... | 713/320 |
| 2003/0101362 A1* | 5/2003 | Dia | ............................. | 713/300 |
| 2004/0102931 A1* | 5/2004 | Ellis et al. | ..................... | 702/188 |
| 2005/0005073 A1* | 1/2005 | Pruvost et al. | ............... | 711/148 |

\* cited by examiner

*Primary Examiner*—Thomas Lee
*Assistant Examiner*—Ji H Bae

(57) ABSTRACT

An apparatus that contains an instruction processing circuit (14), a main memory (18) addressable by the instruction processing circuit (14) and a cache memory (16). In a normal mode the cache memory (16) is used to cache a part of data and/or instructions that the instruction processing circuit (14) addresses in the main memory (18) during execution, and to substitute cached data and/or instructions when the instruction processing circuit (14) addresses the data and/or instructions in the main memory (18). The circuit is able to switch to a low power operating mode. Upon the switch an interrupt program for executing a function during operation in the low power operating mode is loaded into the cache memory (16) from the main memory (18). Power supply to the main memory (18) is then switched off, but keeping at least a part of the cache memory (16) continuous to receive power supply. This part ensures that the program of instructions for executing the function is available to the instruction processing circuit. The program is executed from said at least part of the cache memory (16) in the low power operating mode.

10 Claims, 1 Drawing Sheet

POWER SAVING OPERATION OF AN APPARATUS WITH A CACHE MEMORY

The invention relates to an apparatus that supports a low power operating mode.

U.S. Pat. No. 5,784,628 describes a method of reducing power consumption by a data processing apparatus. The apparatus switches to a low power mode in which most parts of the apparatus are powered down. Critical data is saved in a memory that is not powered down so that the apparatus can easily resume operation when it leaves the low power mode. Thus, next to a normal operating mode (and next to an "off" mode in which the apparatus does not operate or consume power at all), a low power mode is realized from which the apparatus can resume operation faster than from the off mode.

In many apparatuses it is desirable that the apparatus can perform certain basic functions in the low power mode without switching to the normal operating mode. Typical examples of such functions include processing interrupts caused by user activation of control switches, inspecting possible received messages etc. Switching back the apparatus to a normal operating mode to perform such basic functions would considerably increase power consumption if they have to be performed frequently while the apparatus does not have to return to full operation for other reasons.

In practice the apparatus will be in the low power mode for long periods of time. Therefore it is desirable that power consumption in this low power mode is minimized. This is critical for battery operated apparatuses, but it is also important for other apparatuses, such as mains operated television sets that are switched to standby, in view of the extended period of times that such apparatuses remain in the standby mode.

Known apparatuses that contain a computer processor and a main memory with data and/or instructions for use by the processor are often provided with a cache memory in order to speed up execution. The cache memory temporarily stores copies of part of the data and/or instructions that the processor has addressed in main memory, so that it can be retrieved given its main memory address. When the processor addresses such data and/or instructions again, the cache memory substitutes the cached data and/or instructions for the data and/or instructions from main memory. Thus, the delay before the data and/or instructions becomes available is considerably reduced. Of course, the cache memory is conventionally one of the circuits that are deactivated when the apparatus is switched to the low power mode, because it merely stores redundant copies of part of the data and/or instructions that were used during previous processing.

Among others it is an object of the invention to provide a reduction of power consumption by an apparatus with a low power operating mode.

The apparatus according to the invention is set forth in Claim 1. According to the invention, at least part of a cache memory is selectively kept active in the low power mode while the main memory is deactivated (deactivation typically comprising cutting power supply to the main memory, or at least significantly reducing power supply consumption, so that the main memory is not or not fully operational). Prior to switching to the low power mode a program of instructions that are needed to perform a function while the apparatus is in the low power mode is loaded into the cache memory for later use. When an instruction processing circuit performs the function in the low power mode, it loads the instructions from the cache memory, without activating (supplying full power) the main memory. Because the main memory generally is much larger than the cache memory it generally consumes more power than the relatively small cache memory. On the other hand, the function performed during the low power mode usually requires only modest programs that fit in the cache memory. Hence, power consumption is reduced by using the cache memory as only memory in the low power operating mode.

These and other objects and advantageous aspects of the invention will be described in a non-limitative way using the following figures.

Figure 1:
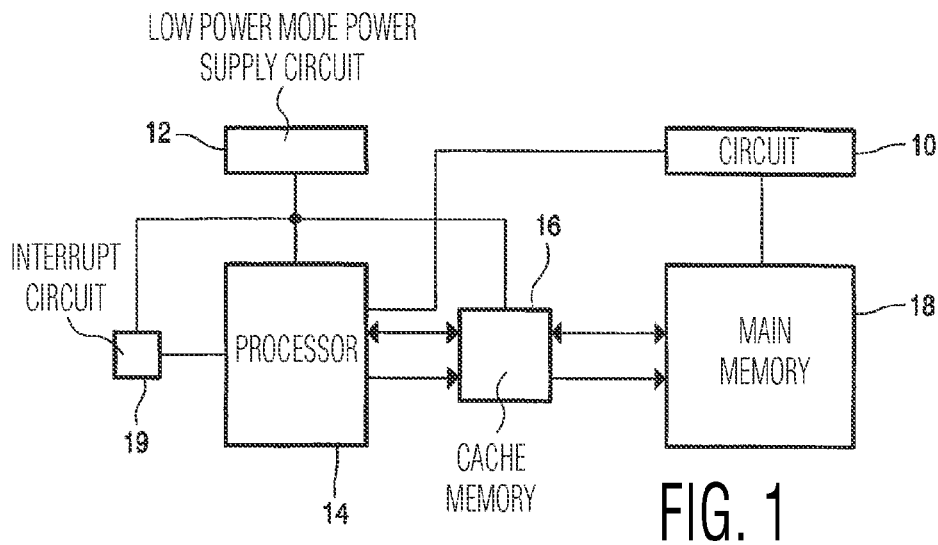
FIG. 1 shows an apparatus that supports a low power operating mode

FIG. 1 shows an apparatus with a main power supply circuit 10, a low power mode power supply circuit 12, a processor 14, a cache memory 16, a main memory 18 and an interrupt circuit 19. It should be realized that FIG. 1 merely provides a simplified schematic drawing, from which many details have been omitted. Main power supply circuit 10 supplies power to main memory 18 and other circuits not shown. Low power mode supply circuit 12 supplies power to processor 14, cache memory 16 and interrupt circuit 19. Processor 14 has an address/data interface coupled to cache memory 16, which in turn has an address/data interface coupled to main memory 18. Interrupt circuit 19 is coupled to processor 14.

In operation the apparatus supports at least a normal operating mode and a low power mode. In the normal operating mode both power supply circuits 10, 12 are active, so that interrupt circuit 19, processor 14, cache memory 16, main memory 18 and any further circuits connected to main power supply circuit 10 are fully operational. In this normal mode processor 14 executes programs of instructions that are retrieved from main memory 18 and/or use data from main memory 18.

In the normal operating mode cache memory 16 functions as a conventional cache memory 16. When processor 14 needs an instruction and/or data, processor 14 outputs the address with which the instruction and/or data is addressed in main memory on its address/data interface. Cache memory 16 receives the address and tests whether an instruction and/or data corresponding to the address is stored in cache memory 16. Techniques for this type of testing are known per se. If the addressed instruction and/or data is available in cache memory 16, cache memory 16 returns the instruction and/or data from cache memory 16. If the addressed instruction and/or data is not available in cache memory 16, cache memory forwards the address to main memory 18, which returns the instruction and/or data to cache memory 16. Cache memory 16 then supplies the instruction and/or data from main memory 18 to processor 14. Preferably, cache memory 16 also stores a copy of this instruction and/or data, for later use, when processor 14 uses the address again. (Generally, without deviating from the invention, main memory 18 will return a line of data, including neighboring instructions and/or data in addition to the addressed instruction and or data, and the whole line will be stored in cache memory 16).

Although cache memory 16 is shown as a single unit for the sake of simplicity, it will be appreciated that cache memory may comprise for example a separate instruction cache memory and a data cache memory, as well as a cache management unit for selecting data and/or instructions that should be retained in cache etc. Similarly, the address/data interface of processor 14 may be connected directly to main memory 18, cache memory 16 intervening only if it detects an address of data that is stored in cache memory 16. Similarly, although main memory 18 is shown as a single block, it should be appreciated that this main memory 18 may comprise different units, such as RAMs or flash memory for data, flash memory or ROM for instructions etc. The words "main memory" should not be taken to imply the absence of any other memory that is distinguished from cache memory 16: "main memory" does not exclude the existence of other, possibly larger memory in the apparatus.

Figure 2:
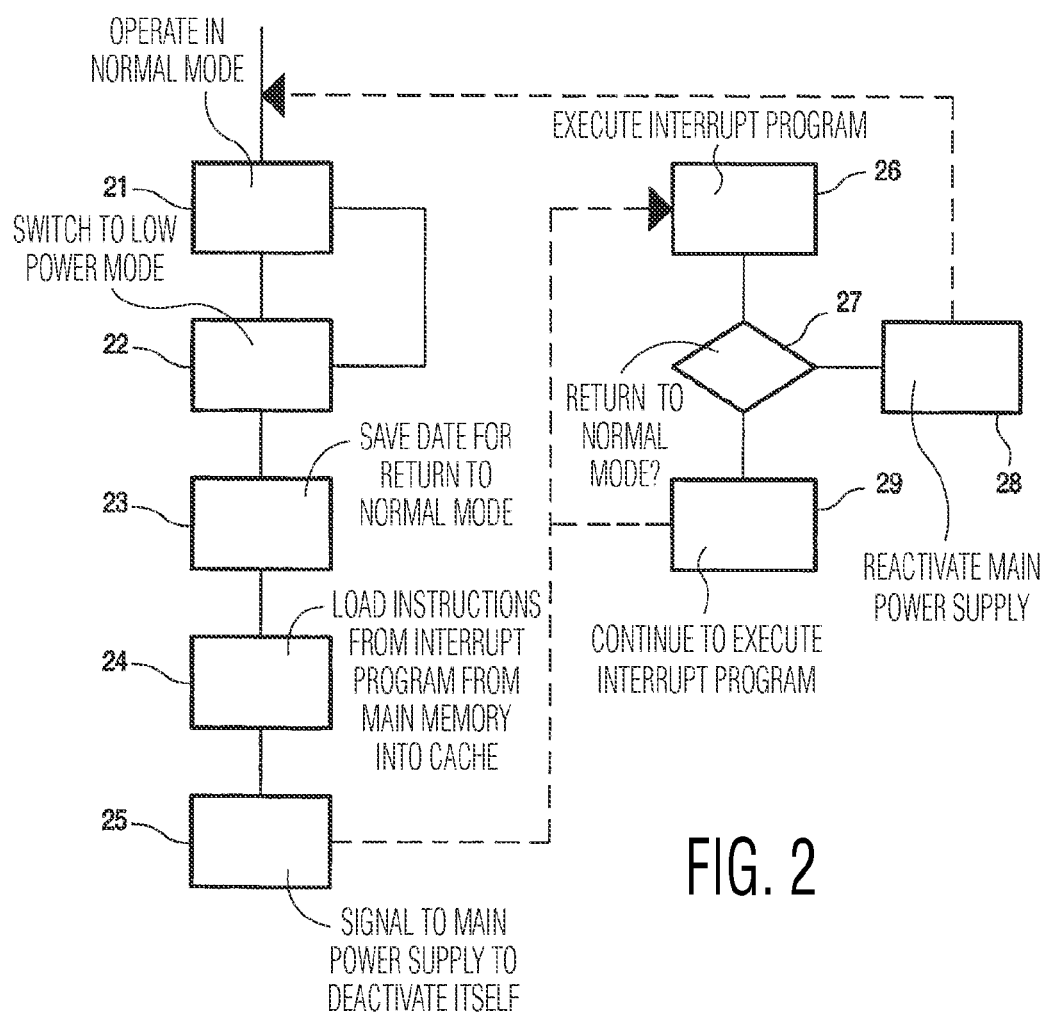
FIG. 2 shows illustrates operation of the apparatus

FIG. 2 illustrates an embodiment of switchover to a low power operating mode and operation in that mode. Initially in a first execution block 21 processor 14 operates in a normal mode. When processor 14 detects in block 22 that it is no longer necessary to operate in the normal mode, processor 14 starts executing a switchover program to switch over to the low power mode. A first step 23 of the switchover program optionally causes data to be saved for later return to the normal operating mode.

In a second step 24 the switchover program causes processor 14 to signal to cache memory 16 to load all instructions of an interrupt program from main memory 18 into cache memory 16. The interrupt program is stored at addresses in main memory that have been selected so that all instructions of the interrupt program can be stored together in cache memory 16.

Various solutions exist for loading the interrupt program. In one example the switchover program is provided with the start address and the end address of the interrupt program, so that the switchover program can address all memory locations from the start address to the end address, forcing them to be loaded into cache memory 16. If it is known that main memory 18 returns lines of instruction and/or data, only one address from each line needs to be addressed.

This assumes that it is guaranteed that cache memory 16 will retain all addressed data. Cache memory 16 may also be provided with a conventional locking mechanism, which enables processor 14 to signal that (and optionally from which addresses) instructions and/or data must be kept in cache. In this case the switchover program preferably makes processor 14 signal to cache memory 16 that the instructions of the interrupt program must be kept. As an alternative the interrupt program (and optionally the switchover program) may be stored at addresses that are selected so that it is ensured in advance that the switchover program can load the entire interrupt program into cache memory 16 without being subsequently discarded. As a further alternative the circuit may be arranged so that the instruction set of processor 14 contains an instruction to cause specified instructions, or specifically the interrupt routine, to be loaded into cache memory 16.

Once the interrupt program has been loaded into cache memory 16, the switchover program executes a third step 25 to cause processor 14 to signal to main power supply circuit 10 to deactivate itself. Next the switchover program may cause processor 14 to switch to a pause mode, or to enter a wait state. The apparatus is now said to have entered the low power operating mode.

During operation in the low power operating mode, in response to some event, such as for example actuation of a user interface button or the like, or reception of a possible message via a bus or a wireless interface, or a periodic timing signal, interrupt circuit 19 may trigger processor 14 to execute the interrupt program. During execution of the interrupt program main memory 18 remains deactivated. A first step 26 of the interrupt program is indicated in FIG. 2 as the target of dashed lines to indicate activation by interrupt.

In first step 26 of the interrupt program processor 14 addresses the instructions of the interrupt program that are stored in cache memory 16 and therefore is able to execute the interrupt program without recourse to main memory 18. If in a second step 27 of the interrupt program the execution of the interrupt program results in a need to return to the normal operating mode, processor 14 will execute a third step 28 of the interrupt program to cause main power supply circuit 10 to reactivate. However, when this is not necessary processor 14 will execute further steps 29, if any, of the interrupt program and main memory 10 will remain deactivated during the entire execution of the interrupt program, the processor 14 eventually returning to a pause more or a wait state.

The apparatus remains in the low power operating mode for example if the interrupt program determines that the possible message that triggered the interrupt was irrelevant, or no valid button was actuated, or no state was the detected that necessitated return to the normal operating mode.

It should be appreciated that additional measures may be taken. For example, in addition to the interrupt program, the switchover program may be arranged to load data relevant for interrupt processing into cache memory 16 from main memory before switching to the low power operating mode. However, this is not necessary, for example if no data is needed, or if a dedicated data memory is provided for data that is needed in the low power operating mode.

Cache memory 16 may be arranged to be switchable between a normal mode and a stand alone mode for use in the low power operating mode. In this case the switchover program makes processor 14 signal to cache memory to enter the stand alone mode before entering the low power operating mode. In the stand alone mode cache memory 16 is arranged to refrain from addressing main memory, either for writing back data or for other purposes. However it should be appreciated that it may not be necessary to support a stand alone mode if execution of the interrupt program does not cause cache memory 16 to access main memory 18.

It should be realized that part of cache memory 16 may be deactivated in the low power operating mode in order to reduce power supply consumption. This may be realized by supplying power to these parts from main power supply circuit 10, or by including an instruction in the switchover program to make processor 14 signal to cache memory 16 to deactivate these parts. Thus, for example, the cache management unit (not shown) that manages replacement of data in cache memory 16 may be switched off. The same may holds for address comparison circuits that are used to detect whether instructions from the interrupt program are in cache memory 16, since it is known that these instructions are in cache memory 16 in the low power operating mode. Similarly, excess storage capacity of cache memory 16, which is not needed during operation in the low power operating mode may be deactivated.

Although a single processor 14 has been shown, it should be realized that in practice an instruction processing circuit may used that contains more than one processor coupled to cache memory 16, of which part may be deactivated in the low power operating mode, for example because they receive power supply from main power supply circuit 10. In this case, for example, a processor with limited performance and low energy consumption may be included in the instruction processing circuit for executing the interrupt program.

Although the invention has been illustrated for execution of an interrupt program during the low power operating mode, it will be appreciated that the invention also applies to other types of program, such as a program that loops during the low power operating mode, without be triggered by interrupt circuit 19, which may be omitted in this case. Similarly, a plurality of interrupt programs, for servicing different types of interrupt may be kept in cache memory 16 in the low power operating mode.

Similarly, other measures may be taken to reduce power consumption in the low power operating mode, such as lowering the supply voltage, reducing the instruction cycle frequency etc. For this purpose, circuits such as cache memory 16 that are active in both the normal operating mode and the low power operating mode may be switched to receive power from main power supply circuit 10 in the normal operating mode and from a dedicated power supply circuit in the low power operating mode.

Although switching to the low power operating mode has been described in terms of deactivating main power supply circuit 10, e.g. by making a switch between a source of power and the circuit non-conductive, it will be realized that other ways of deactivation to reduce power consumption can be used, such as disabling clock signals or other signals. Cache memory 16 and processor 14 may even be deactivated in this sense during part of the time in the low power operating mode, when it is not operating in the sense of executing the interrupt program, as long as this deactivation does not cause a loss of data or instructions.

Although an embodiment of the invention has been described wherein a switchover program executed by processor 14 controls switching to the low power operating mode, it should be appreciated that alternatively the steps involved switchover may be executed under control of a dedicated (not-programmed) circuit for this purpose, which is activated when the apparatus signals that it should switch to the low power operating mode, or by any other processor, which may have its own access to cache memory 16 and/or main memory for this purpose. Nor does the switchover have to be controlled by a single circuit such as processor 14. For example, part of the switchover, such as loading the interrupt program could be. executed by one circuit, while another part, such as deactivating the main power supply could be executed by another circuit.

The invention claimed is:

1. An apparatus that is switchable to a low power operating mode and to a normal operating mode, the apparatus comprising:
    an instruction processing circuit;
    a main memory for providing instructions for the instruction processing circuit during execution by the instruction processing circuit;
    a cache memory coupled between the instruction processing circuit and the main memory, operable in the normal operating mode to cache a part of data and/or instructions that the instruction processing circuit addresses in the main memory during execution, and to substitute cached data and/or instructions when the instruction processing circuit addresses the data and/or instructions in the main memory;
    low power operating mode activating circuit, arranged to keep part of the apparatus deactivated during operation in the low power operating mode, said part of the apparatus including the main memory, but excluding at least part of the cache memory, the low power mode activating circuit being arranged to load a program of instructions for executing a function during operation in the low power operating mode into said at least part of the cache memory before switching to the low power operating mode;
    wherein the instruction processing circuit is configured to:
        detect when it is no longer necessary to operate in the normal operating mode;
        cause the program of instructions to be loaded into the cache memory when the instruction processing circuit has determined that it is no longer necessary to operate in the normal operating mode; and
        signal to a main power supply circuit to deactivate itself when the instruction processing circuit has determined that it is no longer necessary to operate in the normal operating mode, wherein a cache management unit of the cache memory is deactivated in the low power operating mode.

2. An apparatus according to claim 1, wherein the cache memory is switchable to a locked state, wherein the cache memory is disabled from discarding locked information, the low power operating mode activating circuit being arranged to switch the cache memory to the locked state so as to lock the program of instructions for executing the function in the cache memory.

3. An apparatus according to claim 1, wherein the low power operating mode activating circuit is arranged to load, upon switching to the low power operating mode, all data into the cache memory that will be addressed with addresses in main memory by the program of instructions for executing the function.

4. An apparatus according to claim 1, wherein said program of instructions for executing a function in the low power operating mode is an interrupt program, the apparatus comprising an interrupt circuit for triggering the instruction processing circuit to execute the interrupt program at selected times during operation in the low power operating mode.

5. An apparatus that is switchable to a low power operating mode and to a normal operating mode, the apparatus comprising:
    an instruction processing circuit;
    a main memory for providing instructions for the instruction processing circuit during execution by the instruction processing circuit;
    a cache memory coupled between the instruction processing circuit and the main memory, operable in the normal operating mode to cache a part of data and/or instructions that the instruction processing circuit addresses in the main memory during execution, and to substitute cached data and/or instructions when the instruction processing circuit addresses the data and/or instructions in the main memory;
    low power operating mode activating circuit, arranged to keep part of the apparatus deactivated during operation in the low power operating mode, said part of the apparatus including the main memory, but excluding at least part of the cache memory, the low power mode activating circuit being arranged to load a program of instructions for executing a function during operation in the low power operating mode into said at least part of the cache memory before switching to the low power operating mode;
    wherein the instruction processing circuit is configured to:
        detect when it is no longer necessary to operate in the normal operating mode;
        cause the program of instructions to be loaded into the cache memory when the instruction processing circuit has determined that it is no longer necessary to operate in the normal operating mode; and
        signal to a main power supply circuit to deactivate itself when the instruction processing circuit has determined that it is no longer necessary to operate in the normal operating mode, wherein address comparison circuits of the cache memory are deactivated in the low power operating mode.

6. An apparatus that is switchable to a low power operating mode and to a normal operating mode, the apparatus comprising:
- an instruction processing circuit;
- a main memory for providing instructions for the instruction processing circuit during execution by the instruction processing circuit;
- a cache memory coupled between the instruction processing circuit and the main memory, operable in the normal operating mode to cache a part of data and/or instructions that the instruction processing circuit addresses in the main memory during execution, and to substitute cached data and/or instructions when the instruction processing circuit addresses the data and/or instructions in the main memory;
- low power operating mode activating circuit, arranged to keep part of the apparatus deactivated during operation in the low power operating mode, said part of the apparatus including the main memory, but excluding at least part of the cache memory, the low power mode activating circuit being arranged to load a program of instructions for executing a function during operation in the low power operating mode into said at least part of the cache memory before switching to the low power operating mode;
- wherein the instruction processing circuit is configured to:
  - detect when it is no longer necessary to operate in the normal operating mode;
  - cause the program of instructions to be loaded into the cache memory when the instruction processing circuit has determined that it is no longer necessary to operate in the normal operating mode; and
  - signal to a main power supply circuit to deactivate itself when the instruction processing circuit has determined that it is no longer necessary to operate in the normal operating mode, wherein excess storage capacity of the cache memory is deactivated in the low power operating mode.

7. A method of operating an apparatus that contains an instruction processing circuit, a main memory addressable by the instruction processing circuit and a cache memory, the method comprising:
- using the cache memory and the main memory in a normal operating mode, to cache in cache memory a part of data and/or instructions that the instruction processing circuit addresses in the main memory during execution, and to substitute cached data and/or instructions when the instruction processing circuit addresses the data and/or instructions in the main memory;
- storing, in the main memory, a program of instructions for executing an interrupt function during operating in a low power operating mode, wherein the interrupt program is stored at addresses in main memory that have been selected so that all instructions of the interrupt program can be stored together in the cache memory;
- detecting that it is no longer necessary to operate in the normal operating mode;
- switching to the low power operating mode once it is detected that it is no longer necessary to operate in the normal operating mode, by
  - loading the interrupt program into the cache memory from the main memory, wherein all instructions of the interrupt program are stored together in the cache memory;
  - deactivating the main memory to reduce power consumption, but keeping active at least a part of the cache memory, that is needed for retrieving the interrupt program and for executing the interrupt function;
  - executing the interrupt program from said at least part of the cache memory.

8. The method according to claim 7, wherein switching to the low power operating mode further comprises deactivating a cache management unit of the cache memory.

9. The method according to claim 7, wherein switching to the low power operating mode further comprises deactivating address comparison circuits of the cache memory.

10. The method according to claim 7, wherein switching to the low power operating mode further comprises deactivating excess storage capacity of the cache memory.

* * * * *